United States Patent
Singh et al.

(10) Patent No.: US 10,521,359 B2
(45) Date of Patent: Dec. 31, 2019

(54) SECURE DISTANCE COMPUTATIONS

(71) Applicant: International Business Machines Corporation, Armonk, NY (US)

(72) Inventors: Gagandeep Singh, Bangalore (IN); Akshar Kaul, Karnataka (IN); Manish Kesarwani, Bangalore (IN); Prasad Naldurg, Bangalore (IN); Sameep Mehta, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 298 days.

(21) Appl. No.: 15/589,112

(22) Filed: May 8, 2017

(65) Prior Publication Data

US 2018/0323978 A1    Nov. 8, 2018

(51) Int. Cl.
| | |
|---|---|
| *G06F 12/14* | (2006.01) |
| *H04L 9/08* | (2006.01) |
| *G06F 21/62* | (2013.01) |
| *G06F 16/22* | (2019.01) |

(52) U.S. Cl.
CPC ...... *G06F 12/1408* (2013.01); *G06F 21/6254* (2013.01); *H04L 9/0894* (2013.01); *G06F 16/221* (2019.01); *G06F 16/2282* (2019.01)

(58) Field of Classification Search
CPC ............. G06F 12/1408; G06F 16/2282; G06F 16/221; G06F 2212/1052; H04L 9/0894
See application file for complete search history.

(56) References Cited

U.S. PATENT DOCUMENTS

| | | | |
|---|---|---|---|
| 9,577,987 B2* | 2/2017 | Faith | H04L 63/0428 |
| 9,613,292 B1* | 4/2017 | El Defrawy | G06K 9/6201 |
| 2010/0114905 A1* | 5/2010 | Slavik | G06F 16/29 |
| | | | 707/743 |

(Continued)

OTHER PUBLICATIONS

Choi et al., Fast Parallel k-NN Search in High-Dimensional Spaces, 2012, IARIA (Year: 2012).*

(Continued)

*Primary Examiner* — Saleh Najjar
*Assistant Examiner* — Louis C Teng
(74) *Attorney, Agent, or Firm* — Ryan, Mason & Lewis, LLP (57) ABSTRACT

Methods, systems, and computer program products for secure distance computations are provided herein. A computer-implemented method includes transforming a set of multiple data points, thereby creating a multiple-dimension representation of the set of data points; storing multiple distinct portions of the multiple-dimension representation of the set of data points across multiple distinct cloud infrastructures; transforming a query point, thereby creating a multiple-dimension representation of the query point; sending multiple distinct portions of the multiple-dimension representation of the query point to the multiple distinct cloud infrastructures; calculating a distance between each of the stored distinct portions of the multiple-dimension representation of the set of data points and each of the sent distinct portions of the multiple-dimension representation of the query point; determining a total distance value by summing the calculated distances; and outputting the total distance value to at least one user.

20 Claims, 7 Drawing Sheets

(56) References Cited

U.S. PATENT DOCUMENTS

| | | | | |
|---|---|---|---|---|
| 2013/0142323 | A1* | 6/2013 | Chiarella | H04L 63/0428 380/28 |
| 2014/0115338 | A1* | 4/2014 | Faith | H04L 63/0428 713/176 |
| 2016/0358312 | A1* | 12/2016 | Kolb | G06T 5/003 |
| 2018/0323978 | A1* | 11/2018 | Singh | G06F 12/1408 |
| 2018/0336661 | A1* | 11/2018 | Kolb | G06T 5/003 |
| 2019/0087445 | A1* | 3/2019 | Zhu | H04L 12/44 |
| 2019/0116372 | A1* | 4/2019 | Cohen | H04N 19/44 |

OTHER PUBLICATIONS

Zhu et al., Collusion-Resisting Secure Nearest Neighbor Query over Encrypted Data in Cloud, Revisited, 2016, IEEE (Year: 2016).*

Zhu et al., Secure and controllable k-NN query over encrypted cloud data with key confidentiality, 2015, Elsevier (Year: 2015).*

Rokade et al., "Private kNN Query Processing in Cloud Environments," SPCOE, Dumberwadi, vol. 3, Issue 6, Jun. 2015.

Elmehdwi et al., "Secure k-Nearest Neighbor Query over Encrypted Data in Outsourced Environments," Department of Computer Science, Missouri S&T, 2014.

Cheng et al., "Secure Nearest Neighbor Query on Crowd-Sensing Data," Sensors (Basel). Oct. 2016; 16(10): 1545.

Kaur et al., "Nearest neighbor search on large-scale data using skip graph," International Journal of Computer Application (2250-1797), vol. 6—No. 4, Aug. 2016.

Bost et al., "Machine Learning Classification over Encrypted Data," NDSS 2015.

Zhu et al., "Secure k-nn computation on encrypted cloud data without sharing key with query users," Proceedings of the 2013 international workshop on Security in cloud computing. ACM, 2013.

Yao et al., "Secure nearest neighbor revisited," ICDE, 2013.

Wikipedia, "Similarity (geometry)," https://en.wikipedia.org/w/index.php?title=Similarity_(geometry)&oldid=776310709, Apr. 20, 2017.

Wikipedia, "Norm (mathematics)," https://en.wikipedia.org/w/index.php?title=Norm_(mathematics)&oldid=777514297, Apr. 27, 2017.

Wikipedia, "Hypersphere," https://en.wikipedia.org/w/index.php?title=Hypersphere&oldid=775756258, Apr. 16, 2017.

Wikipedia, "Binary heap," https://en.wikipedia.org/w/index.php?title=Binary_heap&oldid=768914237, Mar. 6, 2017.

* cited by examiner

SECURE DISTANCE COMPUTATIONS

FIELD

The present application generally relates to information technology, and, more particularly, to data security.

BACKGROUND

In a cloud setting, a client can provide data and use the cloud resources for one or more computational requirements. This can lead to a data security challenge with respect to any confidential or vulnerable client data.

SUMMARY

In one embodiment of the present invention, techniques for secure distance computations are provided. An exemplary computer-implemented method can include transforming a set of multiple data points, thereby creating a multiple-dimension representation of the set of data points, wherein transforming comprises converting each dimension in each of the data points into multiple dimensions. The method also includes storing multiple distinct portions of the multiple-dimension representation of the set of data points across multiple distinct cloud infrastructures. Additionally, the method includes transforming a query point, thereby creating a multiple-dimension representation of the query point, wherein transforming comprises converting each dimension in the query point into multiple dimensions, and sending multiple distinct portions of the multiple-dimension representation of the query point to the multiple distinct cloud infrastructures. Further, the method includes calculating a distance between (i) each of the stored distinct portions of the multiple-dimension representation of the set of data points and (ii) each of the sent distinct portions of the multiple-dimension representation of the query point, determining a total distance value by summing the calculated distances, and outputting the total distance value to at least one user.

In another embodiment of the invention, an exemplary computer-implemented method can include transforming a data table to a modified version of the data table, wherein transforming comprises converting each dimension in the data table into multiple dimensions. The method also includes applying a permutation to the positioning of each column of the modified version of the data table, dividing the permuted modified version of the data table vertically into multiple distinct sub-tables, and storing the multiple distinct sub-tables across multiple distinct cloud infrastructures. Further, the method includes calculating a distance between (i) data points derived from a particular row in the original data table, stored across the multiple distinct cloud infrastructures and (ii) a particular multi-dimensional query point, which is partitioned into multiple distinct portions and sent to the multiple distinct cloud infrastructures, and outputting the calculated distance to at least one user.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an embodiment of the present invention includes secure distance computations. At least one embodiment of the invention can include securely computing the distance between a query point from a client and a database point(s) in a cloud, without revealing the values in an honest but curious (HBC) adversary model on the cloud. In connection with one or more embodiments of the invention, all relevant points (data points and query points) detailed herein are n dimension ($n \geq 1$) vectors, wherein each dimension is a real number. While storing a data point across multiple cloud infrastructures (wherein each dimension is broken into multiple sub-dimensions), a unique identifier (id) is attached to each piece of data at each cloud infrastructure. This is used for horizontal mapping of a point across multiple cloud infrastructures. The "data point" in a cloud is targeted using this identifier (id). Also, data points are located at multiple cloud infrastructures after an encryption process, while query points are generated according to client wishes.

As further detailed herein, a distance computation can serve as a building block for many data algorithms such as a k-nearest neighbor (k-NN) algorithm, k-means clustering, etc. Additionally, such a distance can be computed in a distributed manner across one or more clouds independently, without revealing values of data to the cloud.

One or more embodiments of the invention can include utilizing a property (as further described herein) of similar right-angle triangles for transforming the query point and data points, for a given n dimensional query point ($q_1, q_2, \ldots, q_n$) and a set of data points of form ($x_1, x_2, \ldots, x_n$), from n dimensional points to m dimensional points ($m > n$). In such an example, the "n dimensional point" is a vector having n terms, wherein each term is a real number. For example, a two-dimensional point might include <23, 1002>. Additionally, one or more embodiments of the invention can include permuting the columns of an m dimensional table and splitting the data across one or more clouds. After permuting the columns of the data table, the positioning of columns in the data table is changed. For example, if columns A, B, C, and D in a data table were physically present in the same order, after permuting, the positioning of the columns can be changed to D, B A, and C, or in some other order depending on the permutation function.

Further, such an embodiment can include submitting the query point in a similar fashion across the one or more clouds, wherein the multiple sub-distance values (received from the two clouds) are computed separately and aggregated at a trusted security agent (SA) to determine the aggregated distance for a specific data point. A trusted SA can include, for example, a machine which is located at the client end. Also, in one or more embodiments of the invention, the administration of such a system does not fall under any cloud infrastructure.

Also, at least one embodiment of the invention can include calculating the distance in the distributed manner across two clouds independently (wherein the clouds are not communicating among themselves), wherein the total distance between the query point and data point is the sum of the two values returned from the two clouds. By way merely of illustration, consider the following example, wherein the relevant data point is X: $\{x_1, x_2 \ldots\}$ and the relevant query point is Q: $\{q_1, q_2, \ldots\}$. For a distance computation, at least one embodiment of the invention includes generating two components, a normal term $(x_1^2+x_2^2+ \ldots +q_1^2+q_2^2+ \ldots)$ and a scalar multiplication product $(x_1*q_1+x_2*q_2+ \ldots)$.

In one or more such embodiments, the generated normal term can be stored as is on a server. With respect to generating scalar multiplication products, each dimension can be divided and/or segmented into multiple dimensions using a property of right-angled triangles. For two similar right-angled triangles xyz and x'y'z', right-angled opposite to side x and x', respectively, $x*x'=y*y'+z*z'$. An important aspect involved in such an example is the angle between x and one of dimension y or dimension z. The new dimensions thus created can be further broken down to multiple dimensions using the above techniques one or more times in iterative fashion. In the given example, if the original dimension was x, the new dimensions can include y and z. The angle chosen between sides x and y (or z) can act as an encryption key for that process. Also, note that the new dimensions thus created could further be broken down into multiple dimensions using the same property.

Figure 1:
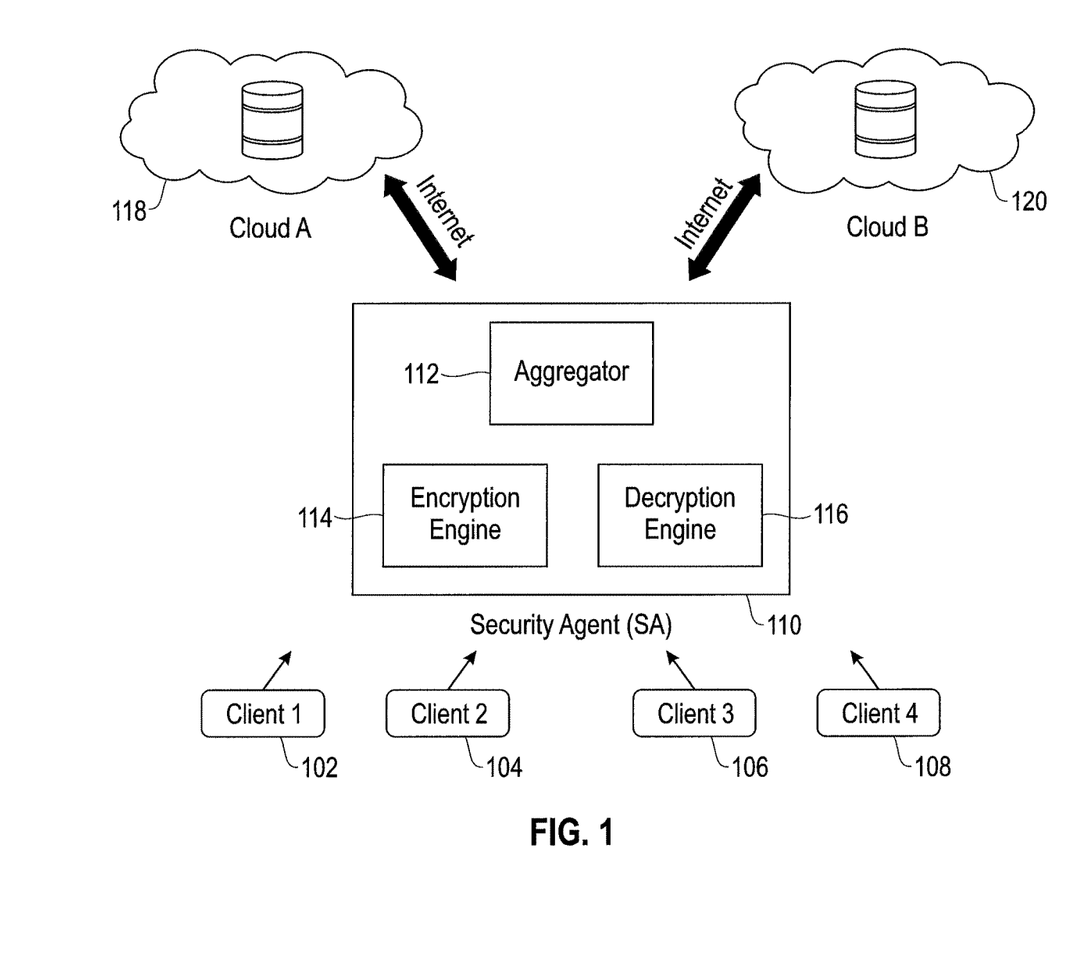
FIG. 1 is a diagram illustrating system architecture, according to an exemplary embodiment of the invention.

FIG. 1 is a diagram illustrating system architecture, according to an embodiment of the invention. By way of illustration, FIG. 1 depicts clients 102, 104, 106 and 108, as well as a security agent (SA) 110 (which can connect to the clients via the Internet), which includes an encryption engine 114, a decryption engine 116, and an aggregator 112. Further, FIG. 1 depicts cloud 118 and cloud 120, which also connect to the SA via the Internet. In one or more embodiments of the invention, cloud 118 and cloud 120 can be used to jointly store information pertaining to the relevant data points. Additionally, one or more embodiments of the invention include operating under the assumption that clouds 118 and 120 represent HBC and non-colluding adversary models.

As additionally depicted in FIG. 1, the SA can represent a trusted machine that includes an encryption engine 114, a decryption engine 116, and an aggregator 112. The encryption engine 114 encrypts the data points and the query points directed for clouds 118 and 120. The data points can be obtained or derived from the client and/or another source.

The decryption engine 116 decrypts the result set coming from clouds 118 and 120. Additionally, the aggregator 112 aggregates the distance value coming from clouds 118 and 120 for specific data points (in cloud 118 and/or cloud 120) with respect to a client-asked query point (derived from one or more of clients 102, 104, 106 and 108). Clients 102, 104, 106 and 108 can ask the SA for the distance computation with respect to a given query point and given data points stored in cloud 118 and/or 120.

In computing a distance calculation, one or more embodiments of the invention can carry out the following steps, as illustrated in conjunction with FIG. 1. Clients 102, 104, 106 and/or 108 can provide a query point "q" of "n" dimensions to SA 110. The SA 110 converts the "n" dimension data to "m" dimension data using an encryption algorithm (via encryption engine 114), and applies a permutation π to the "m" dimension data. A permutation is applied to randomize the positioning of the columns (at the table level) and/or dimensions (at the row level). Such a permutation is applied to avoid the localization of broken down columns and/or dimensions which originally came from one column and/or dimension. For example, if there are m columns to permute, there are m! (m factorial) ways of randomizing the positioning. By way of further example, it might be one of the randomly chosen ways out of the m! ways.

Additionally, the SA 110 splits the permuted "m" dimension data and sends a first portion of the split data to cloud 118 and a second, different portion of the split data to cloud 120, along with a normal term of the original data point. If "n" dimension original data are converted to "m" dimension data, and then dimensions are permuted among themselves, the data set is vertically broken into two equal-size pieces, wherein one piece is sent to one cloud and the other piece is sent to the other cloud. The horizontal relation is maintained by adding "id" columns to both of the pieces.

Clouds 118 and 120, on receiving the (split) query point data, can carry out one or more tasks. For example, clouds 118 and 120 can compute the scalar multiplication summation ($\Sigma_{MULT}$) of the received query point data. Additionally, clouds 118 and 120 can add $\Sigma_{MULT}$ of each term to the normal terms to determine a final sum ($\Sigma$). Such a determination can be performed, for example, on a cloud where normal terms are present. Clouds 118 and 120 can then return an output of (id, $\Sigma$) to the aggregator 112 of the SA 110. The aggregator 112 can then add the $\Sigma$s received from clouds 118 and 120 to compute the final distance from query point q to the points (in clouds 118 and 120).

By way of additional illustration, at least one embodiment of the invention can include computing a Euclidean distance (ED) between a query point $\{q_1, q_2, q_3, \ldots, q_n\}$ and a data point $\{d_1, d_2, d_3, \ldots, d_n\}$, via the following equation: $ED^2 = q_1^2 + \ldots + q_n^2 + x_1^2 + \ldots + x_n^2 - 2(q_1*x_1 + \ldots + q_n*x_n)$. Accordingly, such an embodiment involves a normal term ($\{q_1^2 + \ldots + q_n^2 + x_1^2 + \ldots + x_n^2\}$) and scalar multiplications ($\{q_1*x_1, \ldots, q_n*x_n\}$). Additionally, in a cloud scenario, such an embodiment can include storing the normal term (with respect to a data point), as is, on the cloud, and the only information that the cloud could retrieve would be the hypersphere on which the data point lies. In computing the scalar multiplications, such an embodiment (as detailed above) can include selecting one property of similar right-angled triangles to divide each data dimension into multiple dimensions.

For example, for two similar right-angled triangles, ABC and XYZ, right angled at points B and Y, respectively, consider the following equation: $AC*XZ = AB*XY + BC*YZ$. A property that can be utilized in the above example for dividing AC (from the data point) and XZ (from the query point) can include the angle between the sides AC and BC (or XZ and YZ). Each dimension can be treated as a hypotenuse of a right-angle triangle (that is, the side opposite the 90 degree angle), and then broken down to the other two sides. This preserves the scalar product, which is useful in calculating the Euclidean distance. The new dimensions (AB, BC) thus created can be further broken down to multiple dimensions as detailed above, one or more times, using one or more different angles. Similar to the logic detailed above, these new dimensions can be treated as a hypotenuse of other new right-angled triangles, and brokendown further to two adjacent sides of that new triangle. Also, in one or more embodiments of the invention, an encryption algorithm (such as detailed herein) can be implemented to divide input data into multiple dimensions using a sequence of angles as the encryption key.

Figure 2:
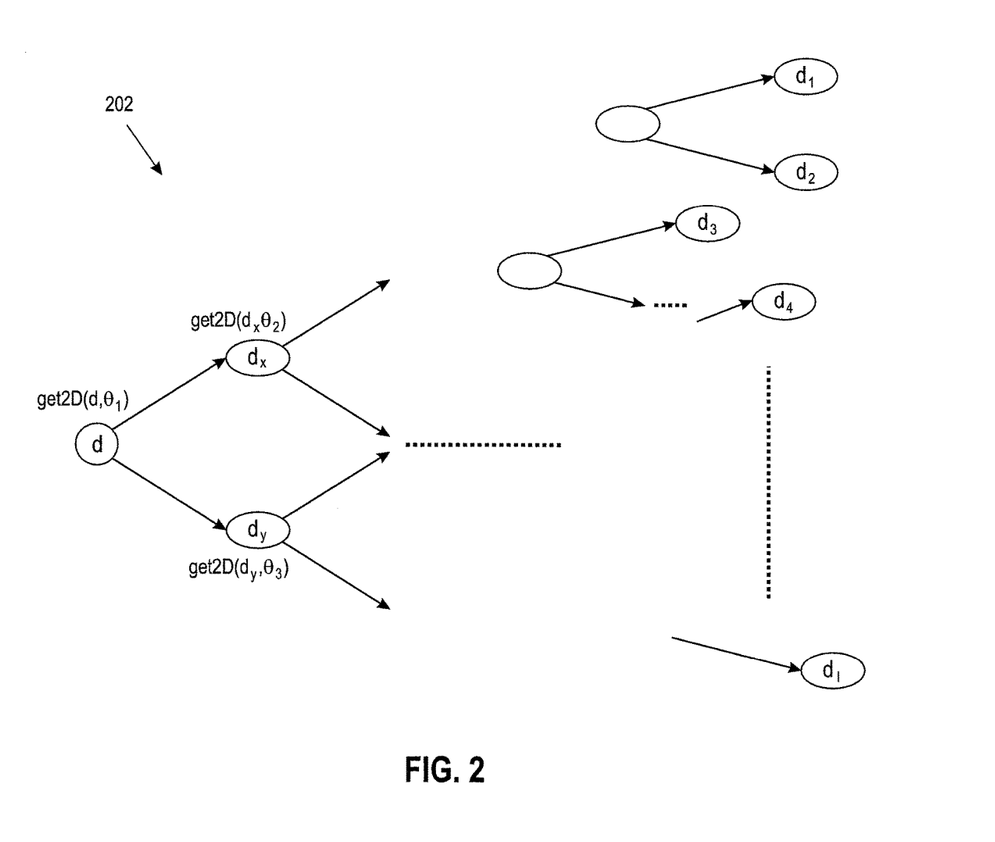
FIG. 2 is a diagram illustrating an encryption algorithm, according to an exemplary embodiment of the invention.

FIG. 2 is a diagram illustrating an encryption algorithm 202, according to an exemplary embodiment of the invention. As depicted in FIG. 2, consider the function of get2D (data, Key): {x=data·cos(key); y=data·sin(key); return x, y}. Such a function includes passing the data value and the key to generate two new dimensions as an output. Using the same function, at least one embodiment of the invention can including dividing a particular dimension into multiple-dimension representations. By way of example, and as illustrated in FIG. 2, one of the dimension values "d" in the data point is transformed to 1 dimension data $\{d_1, d_2, d_3, \ldots, d_l\}$. The sequence of angles $(\theta_1, \theta_2, \ldots, \theta_k)$ used are keys for that particular dimension. These angles can be chosen, for example, by business owner administrators. The value of these angles can lie between 0 and 90 degrees, excluding the boundaries (0 and 90 degrees). Also, in one or more embodiments of the invention, the keys and level to which the particular dimension needs to be divided can be a system designer's configurable decision. Using the above-noted techniques over every column, an n-dimension data table can be transformed to an m-dimension table, wherein m is a larger number than n. In such a context, m and n represent the number of columns (or dimensions) in the data table.

Figure 3:
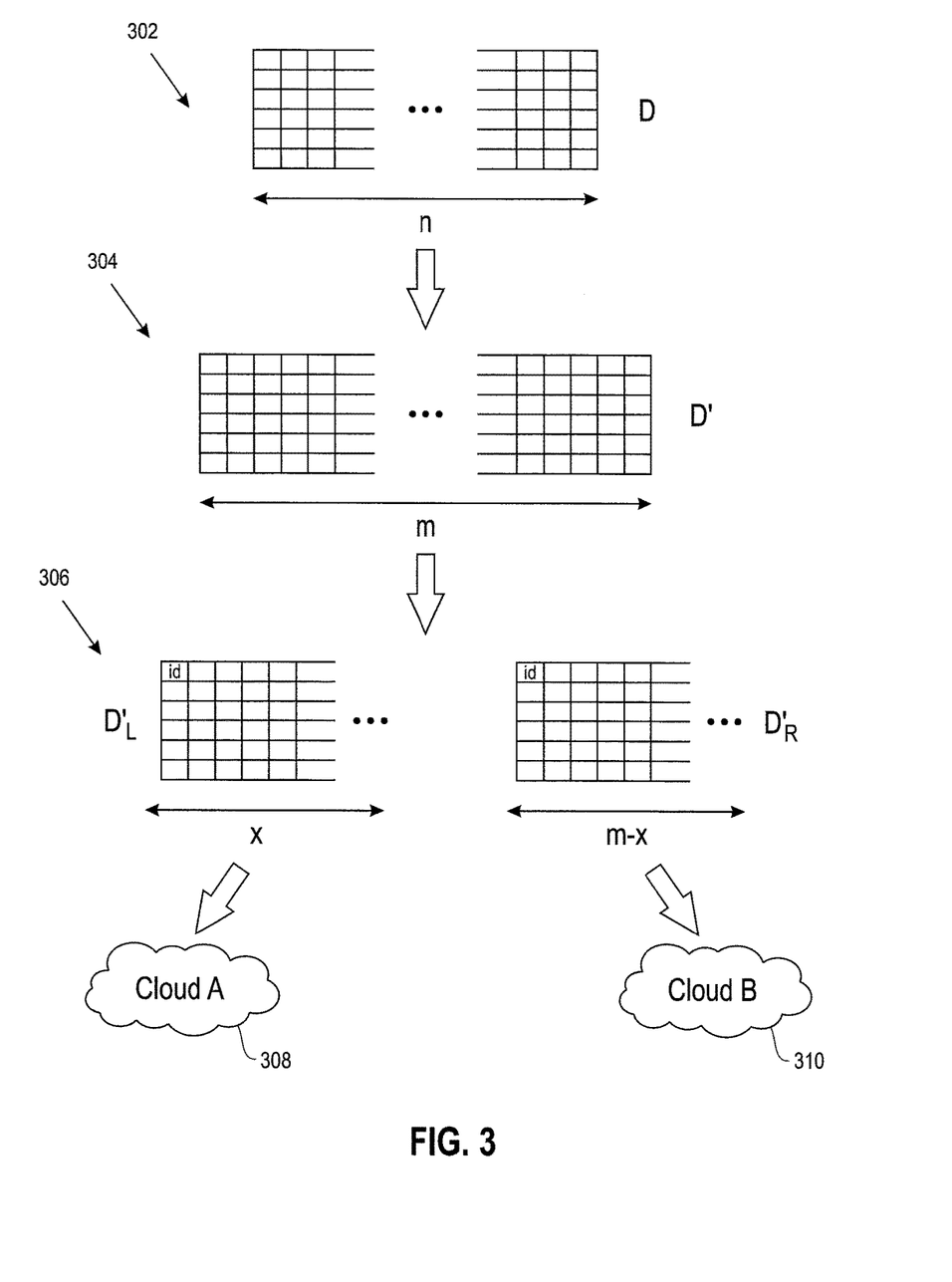
FIG. 3 is a diagram illustrating data storage over clouds, according to an exemplary embodiment of the invention.

FIG. 3 is a diagram illustrating data storage over clouds, according to an exemplary embodiment of the invention. As depicted in FIG. 3, step 302 includes converting an n-dimension table D to an m-dimension table D' using an encryption algorithm (EA) (such as detailed in connection with FIG. 2). For storage of these tables on cloud 308 and cloud 310, at least one embodiment of the invention can carry out steps 304 and 306, as depicted in FIG. 3. Step 304 includes permuting the columns of table D' among themselves; that is, applying a permutation π on the column layout of table D'. Step 306 includes splitting and/or dividing table D' vertically to create two tables, $D'_L$ and $D'_R$, while adding the column 'id' to both created tables for maintaining a horizontal relationship between the tables. As used herein, an "id" column is a column wherein each value is carrying a unique value across rows in the table. For example, the table D' is broken down vertically into two new tables stored at two clouds, which results in a row is now being split across two data tables at two clouds. To maintain the reference of a full row across two clouds (a horizontal relationship), a new column "id" is added to the broken pieces of the row carrying the same unique value across the two clouds.

Also, in one or more embodiments of the invention, an extra column can be added in one of the tables to contain the normal information for that point. In the above context, point refers to the row of the data table. Also, the table receiving the extra column can be chosen, for example, by the business owner administrators. Further, as depicted in FIG. 3, the two tables, $D'_L$ and $D'_R$, are stored on two separate clouds (cloud 308 and cloud 310, respectively).

As noted herein, at least one embodiment of the invention can include carrying out a distance calculation between given data points and a given query point. In such an embodiment, a client provides an n-dimension query point to a SA, wherein the SA includes an encryption engine that transforms the n-dimension query point to an m-dimension point and sends the m-dimension query point to two (or more) clouds (as detailed herein). Additionally, an aggregator, resident at the SA, calculates and stores the normal term component of the n-dimension query point.

Further, each cloud, on receiving the (split) m-dimension query point, can carry out one or more tasks. For example, each cloud can compute the summation of scalar multiplication terms ($\Sigma_{MULT}$) for the m-dimension query point, and subtract $\Sigma_{MULT}$ from the normal terms (which results in $\Sigma$). Such steps can be performed on a cloud where normal terms are present; otherwise, $\Sigma_{MULT}$ is subtracted from 0. Subsequently, each cloud can return an output (id, $\Sigma$) to the aggregator. The aggregator can then add the $\Sigma$s received from the two (or more) clouds to determine the final distance from the points in an encrypted database. Such an encrypted database refers to the transformed tables that are stored at the two clouds.

Accordingly, one or more embodiments of the invention include computing the two components of a distance calculation at each of the clouds, and then aggregating (at the SA) those two components to determine the final distance from the query point to the particular data point. An example use case of carrying out a secure distance calculation via such an embodiment can include solving a secure k-NN problem, such as described below. Solving such a problem includes finding the k nearest neighbors to a query point without disclosing the data and the query point to two clouds. Assuming n-dimension data points and query points in plain text form, one or more embodiments of the invention can include using an encryption algorithm and data storage techniques over the clouds (such as detailed herein) to convert the data points to m dimensions and then store the m-dimension data points over the two clouds.

To obtain a k-NN solution for a given query point, such an example embodiment can include computing the distances (from the given query point) to each of the stored data points over the clouds, and retrieving the stored data points with k minimum distances. In carrying out such an objective, one or more embodiments of the invention can include performing a distance calculation (such as detailed above) to the point wherein the output of (id, $\Sigma$) is computed for each data point, with respect to the query point, over the clouds. A sorted list (in increasing order, for example) of id values and distance components (id, $\Sigma$) can be maintained as a list of nodes over each of the two clouds, sorted with respect to distance. By way of example (and for purposes of illustration through the rest of this example use case description), assume that the lists are referred to as $l_{cloud1}$ and $l_{cloud2}$ for two clouds, respectively.

Further, both clouds can then transfer the first k nodes (of form (id,$\Sigma$)) of their respective lists to the aggregator (at the SA), and the SA can compute the k-NN using an iterative strategy. Such an embodiment assumes access to the two lists, $l_{cloud1}$ and $l_{cloud2}$. Access to each list by the SA can also require the access of data from that particular cloud. The SA is authorized by the business owner to access both clouds.

As noted above, the SA can compute the k-NN using an iterative strategy. Such a strategy, for example, can include the SA maintaining three min-heaps: cloud1_minheap, cloud2_minheap and kNN_minheap. Initially, the SA can receive k nodes each from $l_{cloud1}$ and $l_{cloud2}$. These nodes can be added to heaps as follows. If a node of a particular id is retrieved from both lists, the aggregator aggregates the distance components and adds a node to kNN_minheap having structure (id, distance). Otherwise, the node is added to cloud1_minheap or cloud2_minheap if the node is retrieved from $l_{cloud1}$ or $l_{cloud2}$, respectively.

Additionally, if the top node of kNN_minheap is the minimum of three heaps, that id point is maintained as one of the answers for the k-NN analysis, the top node of KNN_minheap is removed, and the analysis continues to determine the other k−1 points. If the top node of cloud1_minheap top is the minimum, the node with same id from $l_{cloud2}$ is retrieved. The distances of two nodes (that is, the top node of cloud1_minheap and the retrieved node from $l_{cloud2}$) can then be aggregated, the top node of cloud1_minheap can be removed, and a new node can be added to kNN_minheap with data structure (id, aggregated distance). If the top node of cloud2_minheap is the minimum, the node with same id from $l_{cloud1}$ can be retrieved. The distances of two nodes (that is, the top node of cloud2_minheap and the retrieved node from $l_{cloud1}$) can then be aggregated, the top node of cloud2_minheap can be removed, and a new node can be added to kNN_minheap with data structure (id, aggregated distance).

Further, if, during the process, any of the two cloud heaps (cloud1_minheap or cloud2_minheap) become empty, then the next k points can be retrieved from $l_{cloud1}$ or $l_{cloud2}$ and added to the respective heap.

Figure 4:
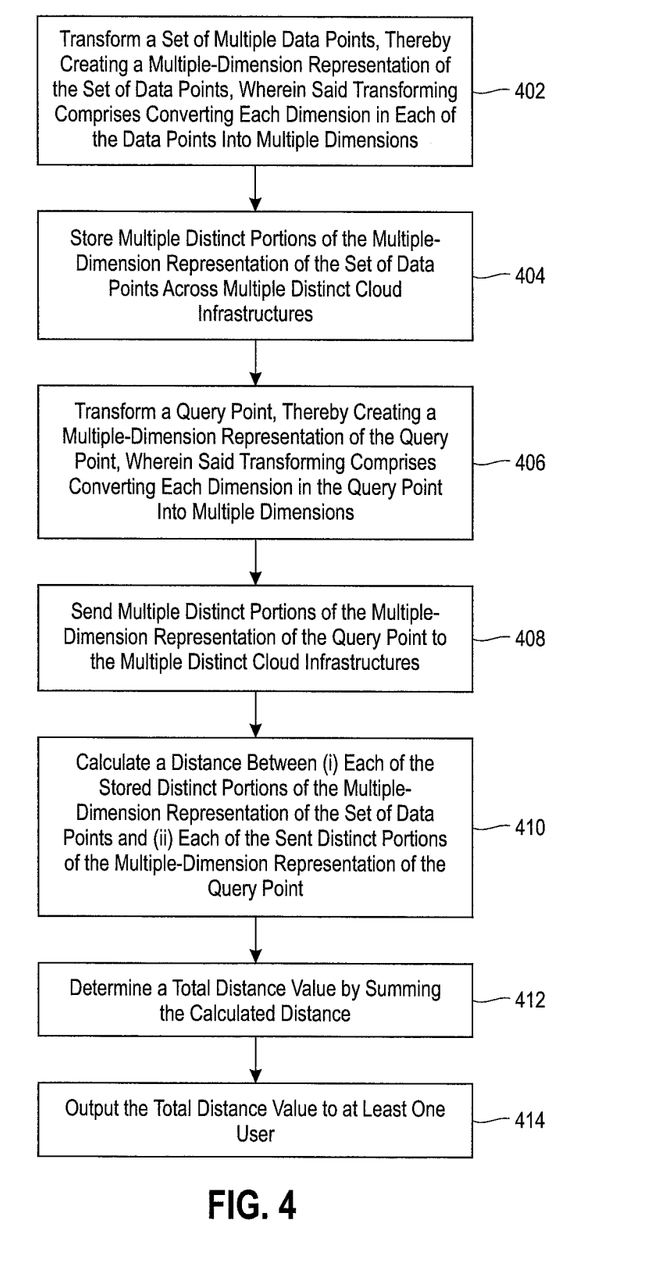
FIG. 4 is a flow diagram illustrating techniques according to an embodiment of the invention.

FIG. 4 is a flow diagram illustrating techniques according to an embodiment of the present invention. Step 402 includes transforming a set of multiple data points, thereby creating a multiple-dimension representation of the set of data points, wherein said transforming comprises converting each dimension in each of the data points into multiple dimensions. Converting each dimension in each of the data points into multiple dimensions can include applying an encryption algorithm to each of the data points. Also, at least one embodiment of the invention can include storing each of the data points in an encrypted database.

Step 404 includes storing multiple distinct portions of the multiple-dimension representation of the set of data points across multiple distinct cloud infrastructures. Storing the multiple distinct portions of the multiple-dimension representation of the set of data points can include applying a permutation to the multiple-dimension representation of the set of data points. Additionally, storing the multiple distinct portions of the multiple-dimension representation of the set of data points can include dividing the permuted multiple-dimension representation of the set of data points into the multiple distinct portions.

Step 406 includes transforming a query point, thereby creating a multiple-dimension representation of the query point, wherein said transforming comprises converting each dimension in the query point into multiple dimensions. The query point can be obtained, for example, via a client device. Additionally, converting each dimension in the query point into multiple dimensions can include applying an encryption algorithm to the query point.

Step 408 includes sending multiple distinct portions of the multiple-dimension representation of the query point to the multiple distinct cloud infrastructures.

Step 410 includes calculating a distance between (i) each of the stored distinct portions of the multiple-dimension representation of the set of data points and (ii) each of the sent distinct portions of the multiple-dimension representation of the query point. The calculating step can include calculating the distances, in an honest but curious adversary model on the multiple distinct cloud infrastructures, without revealing the values of (i) each of the stored distinct portions of the multiple-dimension representation of the set of data points and (ii) each of the sent distinct portions of the multiple-dimension representation of the query point.

Step 412 includes determining a total distance value by summing the calculated distances. Step 414 includes outputting the total distance value to at least one user. The techniques depicted in FIG. 4 can also include performing at least one of a k-nearest neighbor operation and a k-means clustering operation based on the total distance value.

Also, an additional embodiment of the invention includes transforming a data table to a modified version of the data table, wherein transforming comprises converting each dimension in the data table into multiple dimensions. Such an embodiment also includes applying a permutation to the positioning of each column of the modified version of the data table, dividing the permuted modified version of the data table vertically into multiple distinct sub-tables, and storing the multiple distinct sub-tables across multiple distinct cloud infrastructures. Further, such an embodiment includes calculating a distance between (i) data points derived from a particular row in the original data table, stored across the multiple distinct cloud infrastructures and (ii) a particular multi-dimensional query point, which is partitioned into multiple distinct portions and sent to the multiple distinct cloud infrastructures, and outputting the calculated distance to at least one user.

The techniques depicted in FIG. 4 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 4 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 5:
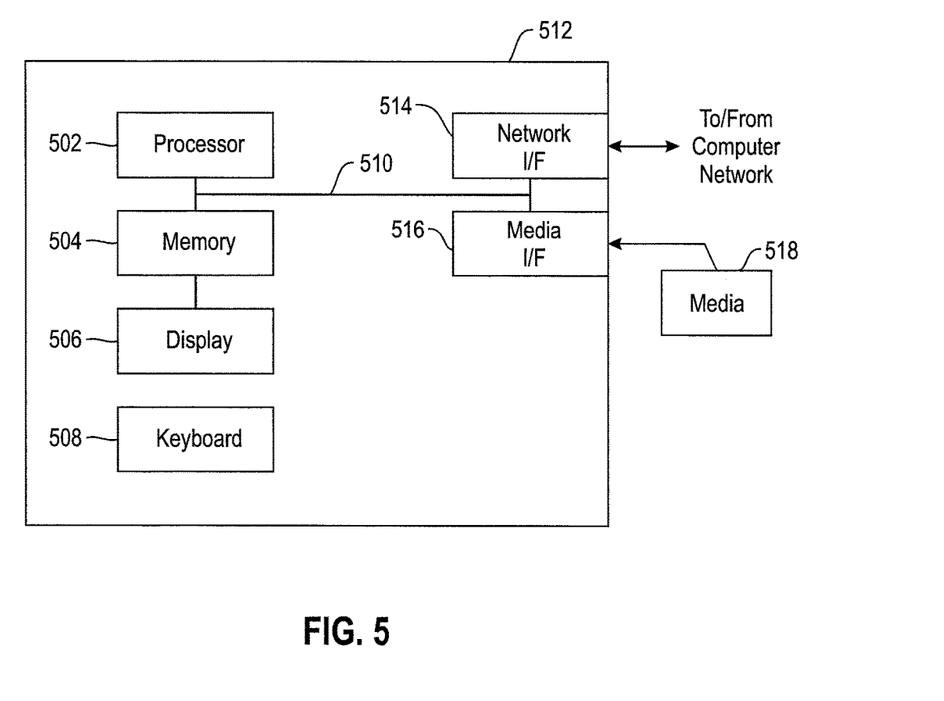
FIG. 5 is a system diagram of an exemplary computer system on which at least one embodiment of the invention can be implemented.

Additionally, an embodiment of the present invention can make use of software running on a computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 502. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
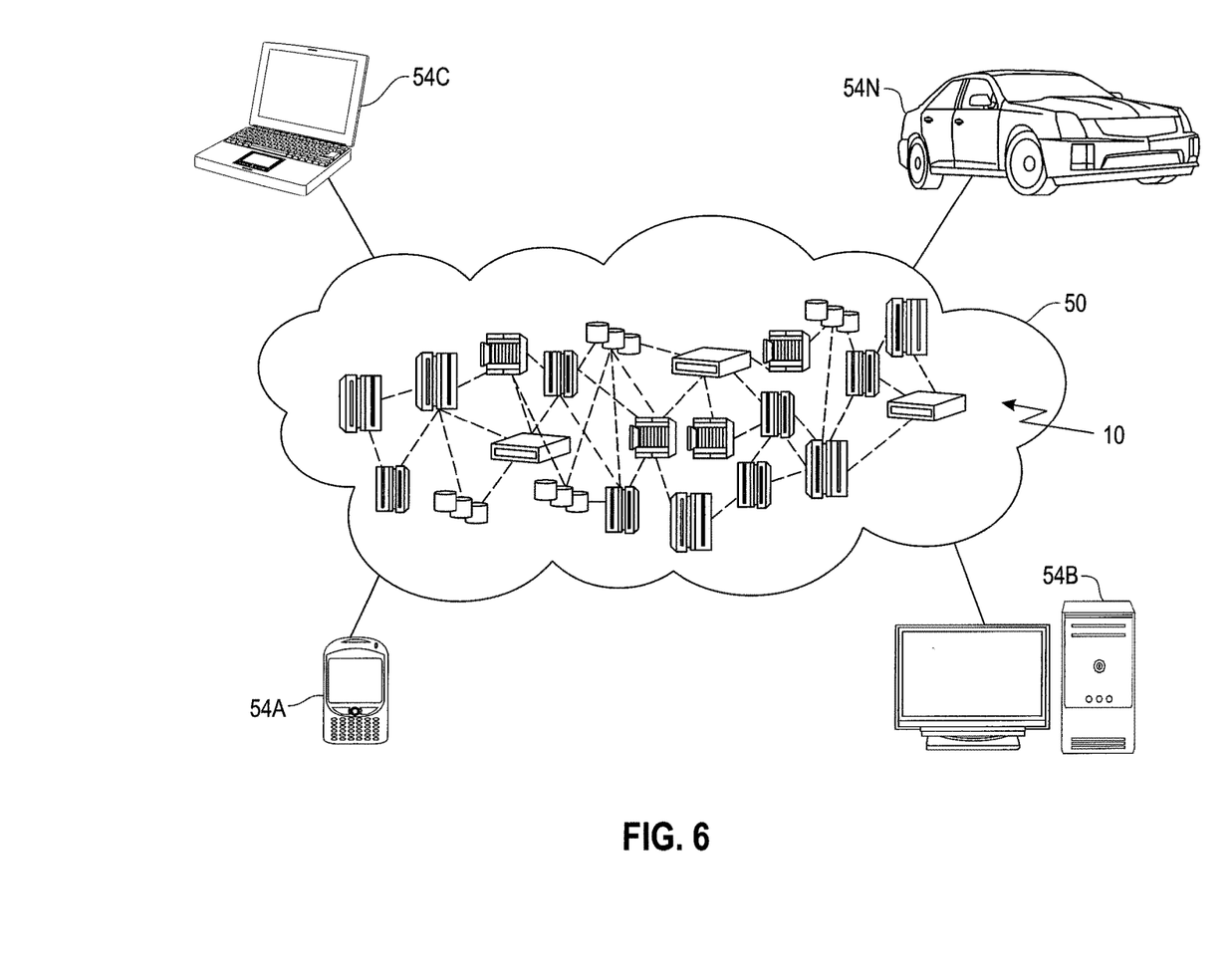
FIG. 6 depicts a cloud computing environment according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
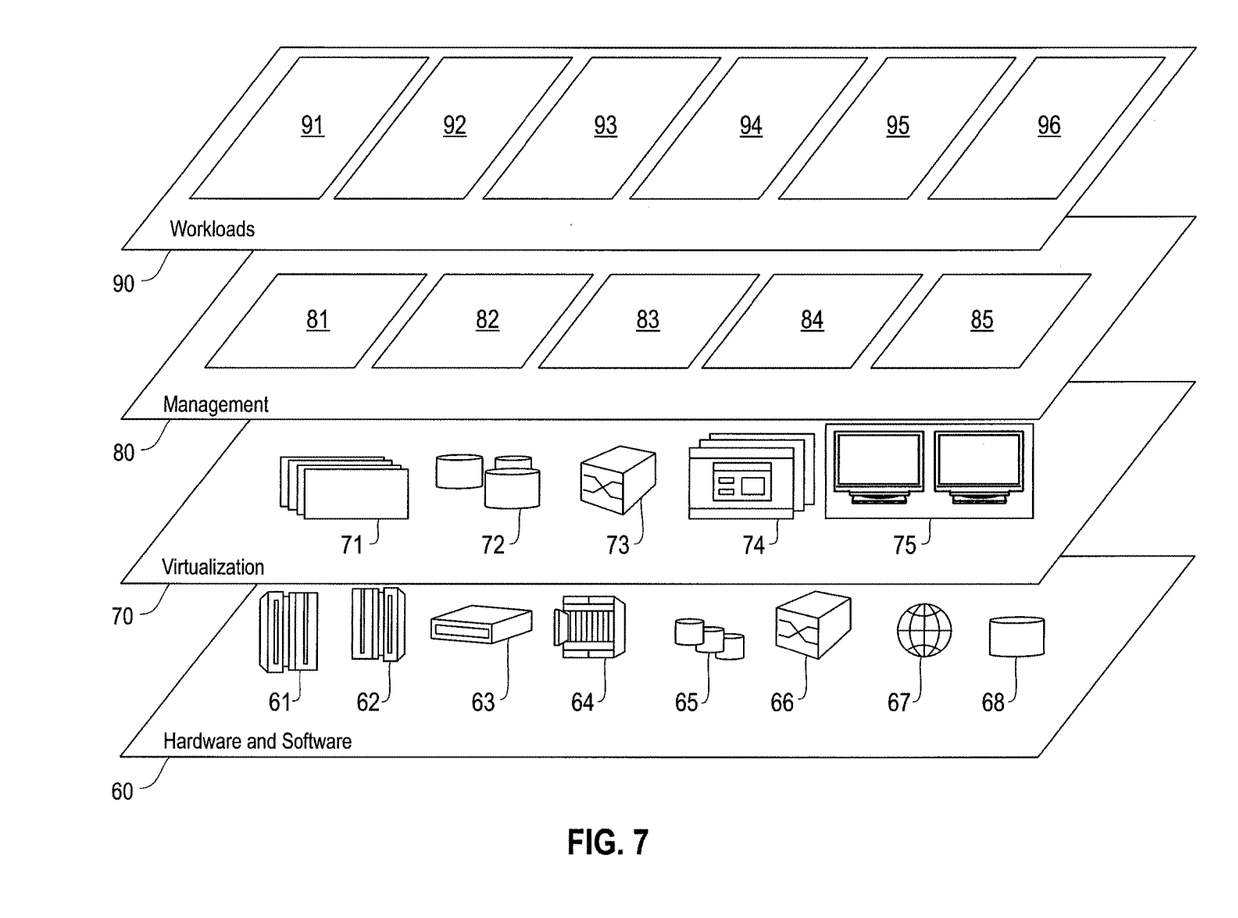
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and secure distance computation 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, utilizing properties of similar right angle triangles for transforming a given n dimensional query point $(q_1, q_2, \ldots, q_n)$ and set of data points of form $(x_1, x_2, \ldots, x_n)$, from n dimensional points to m dimensional points (m>n).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for determining a query point distance computation, comprising:
    transforming a set of multiple data points, thereby creating a multiple-dimension representation of the set of data points, wherein said transforming comprises converting each dimension in each of the data points into multiple dimensions by implementing an encryption algorithm which divides a given dimension (d) into multiple dimensions $(d_1, d_2, \ldots, d_l)$ using a sequence of angles $(\theta_1, \theta_2, \ldots, \theta_l)$ as encryption keys for the multiple dimensions, and wherein the angles comprise user-selected angles between 0 and 90 degrees;
    vertically partitioning and storing multiple distinct portions of the multiple-dimension representation of the set of data points across multiple distinct cloud infrastructures;
    transforming a query point, thereby creating a multiple-dimension representation of the query point, wherein said transforming comprises converting each dimension in the query point into multiple dimensions by implementing the encryption algorithm;
    vertically partitioning and sending multiple distinct portions of the multiple-dimension representation of the query point to the multiple distinct cloud infrastructures;
    calculating a distance between (i) each of the stored distinct portions of the multiple-dimension representation of the set of data points and (ii) each of the sent distinct portions of the multiple-dimension representation of the query point;
    determining a total distance value by summing the calculated distances; and
    outputting the total distance value to at least one user;
    wherein the method is carried out by at least one computing device.

2. The computer-implemented method of claim 1, wherein the query point is obtained via a client device.

3. The computer-implemented method of claim 1, wherein said converting each dimension in the query point into multiple dimensions comprises applying an encryption algorithm to the query point.

4. The computer-implemented method of claim 1, wherein said converting each dimension in each of the data points into multiple dimensions comprises applying an encryption algorithm to each of the data points.

5. The computer-implemented method of claim 1, comprising:
    storing each of the data points in an encrypted database.

6. The computer-implemented method of claim 1, wherein said storing the multiple distinct portions of the multiple-dimension representation of the set of data points comprises applying a permutation to the multiple-dimension representation of the set of data points.

7. The computer-implemented method of claim 6, wherein said storing the multiple distinct portions of the multiple-dimension representation of the set of data points comprises dividing the permuted multiple-dimension representation of the set of data points into the multiple distinct portions.

8. The computer-implemented method of claim 1, wherein said calculating comprises calculating the distances, in an honest but curious adversary model on the multiple distinct cloud infrastructures, without revealing the values of (i) each of the stored distinct portions of the multiple-dimension representation of the set of data points and (ii) each of the sent distinct portions of the multiple-dimension representation of the query point.

9. The computer-implemented method of claim 1, comprising:
    performing at least one of a k-nearest neighbor operation and a k-means clustering operation based on the total distance value.

10. A computer program product comprising a computer readable storage medium having program instructions embodied therewith, the program instructions executable by a device to cause the device to:
    transform a set of multiple data points, thereby creating a multiple-dimension representation of the set of data points, wherein said transforming comprises converting each dimension in each of the data points into multiple dimensions by implementing an encryption algorithm which divides a given dimension (d) into multiple dimensions $(d_1, d_2, \ldots, d_l)$ using a sequence of angles $(\theta_1, \theta_2, \ldots, \theta_l)$ as encryption keys for the multiple dimensions, and wherein the angles comprise user-selected angles between 0 and 90 degrees;
    vertically partition and store multiple distinct portions of the multiple-dimension representation of the set of data points across multiple distinct cloud infrastructures;
    transform a query point, thereby creating a multiple-dimension representation of the query point, wherein said transforming comprises converting each dimension in the query point into multiple dimensions by implementing the encryption algorithm;
    vertically partition and send multiple distinct portions of the multiple-dimension representation of the query point to the multiple distinct cloud infrastructures;
    calculate a distance between (i) each of the stored distinct portions of the multiple-dimension representation of the set of data points and (ii) each of the sent distinct portions of the multiple-dimension representation of the query point;
    determine a total distance value by summing the calculated distances; and
    output the total distance value to at least one user.

11. The computer program product of claim 10, wherein the query point is obtained via a client device.

12. The computer program product of claim 10, wherein said converting each dimension in the query point into multiple dimensions comprises applying an encryption algorithm to the query point.

13. The computer program product of claim 10, wherein said converting each dimension in each of the data points into multiple dimensions comprises applying an encryption algorithm to each of the data points.

14. The computer program product of claim 10, wherein the program instructions executable by a computing device further cause the computing device to:
   store each of the data points in an encrypted database.

15. The computer program product of claim 10, wherein said storing the multiple distinct portions of the multiple-dimension representation of the set of data points comprises applying a permutation to the multiple-dimension representation of the set of data points.

16. A system comprising:
   a memory; and
   at least one processor operably coupled to the memory and configured for:
      transforming a set of multiple data points, thereby creating a multiple-dimension representation of the set of data points, wherein said transforming comprises converting each dimension in each of the data points into multiple dimensions by implementing an encryption algorithm which divides a given dimension (d) into multiple dimensions $(d_1, d_2, \ldots, d_l)$ using a sequence of angles $(\theta_1, \theta_2, \ldots, \theta_l)$ as encryption keys for the multiple dimensions, and wherein the angles comprise user-selected angles between 0 and 90 degrees;
      vertically partitioning and storing multiple distinct portions of the multiple-dimension representation of the set of data points across multiple distinct cloud infrastructures;
      transforming a query point, thereby creating a multiple-dimension representation of the query point, wherein said transforming comprises converting each dimension in the query point into multiple dimensions by implementing the encryption algorithm;
      vertically partitioning and sending multiple distinct portions of the multiple-dimension representation of the query point to the multiple distinct cloud infrastructures;
      calculating a distance between (i) each of the stored distinct portions of the multiple-dimension representation of the set of data points and (ii) each of the sent distinct portions of the multiple-dimension representation of the query point;
      determining a total distance value by summing the calculated distances; and
      outputting the total distance value to at least one user.

17. The system of claim 16, wherein said converting each dimension in the query point into multiple dimensions comprises applying an encryption algorithm to the query point.

18. The system of claim 16, wherein said converting each dimension in each of the data points into multiple dimensions comprises applying an encryption algorithm to each of the data points.

19. The system of claim 16, wherein said storing the multiple distinct portions of the multiple-dimension representation of the set of data points comprises applying a permutation to the multiple-dimension representation of the set of data points.

20. A computer-implemented method, comprising:
   transforming a data table to a modified version of the data table, wherein said transforming comprises converting each dimension in the data table into multiple dimensions by implementing an encryption algorithm which divides a given dimension (d) into multiple dimensions $(d_1, d_2, \ldots, d_l)$ using a sequence of angles $(\theta_1, \theta_2, \ldots, \theta_l)$ as encryption keys for the multiple dimensions, and wherein the angles comprise user-selected angles between 0 and 90 degrees;
   applying a permutation to the positioning of each column of the modified version of the data table;
   dividing the permuted modified version of the data table vertically into multiple distinct sub-tables;
   storing the multiple distinct sub-tables across multiple distinct cloud infrastructures;
   calculating a distance between (i) data points derived from a particular row in the original data table, stored across the multiple distinct cloud infrastructures and (ii) a particular multi-dimensional query point, which is partitioned into multiple distinct portions and sent to the multiple distinct cloud infrastructures; and
   outputting the calculated distance to at least one user;
   wherein the method is carried out by at least one computing device.

* * * * *